Nov. 29, 1932.  W. A. TRYON  1,889,324
METHOD OF FORMING GROOVES IN THE ENDS OF TUBULAR ARTICLES
Filed Jan. 27, 1931  4 Sheets-Sheet 1
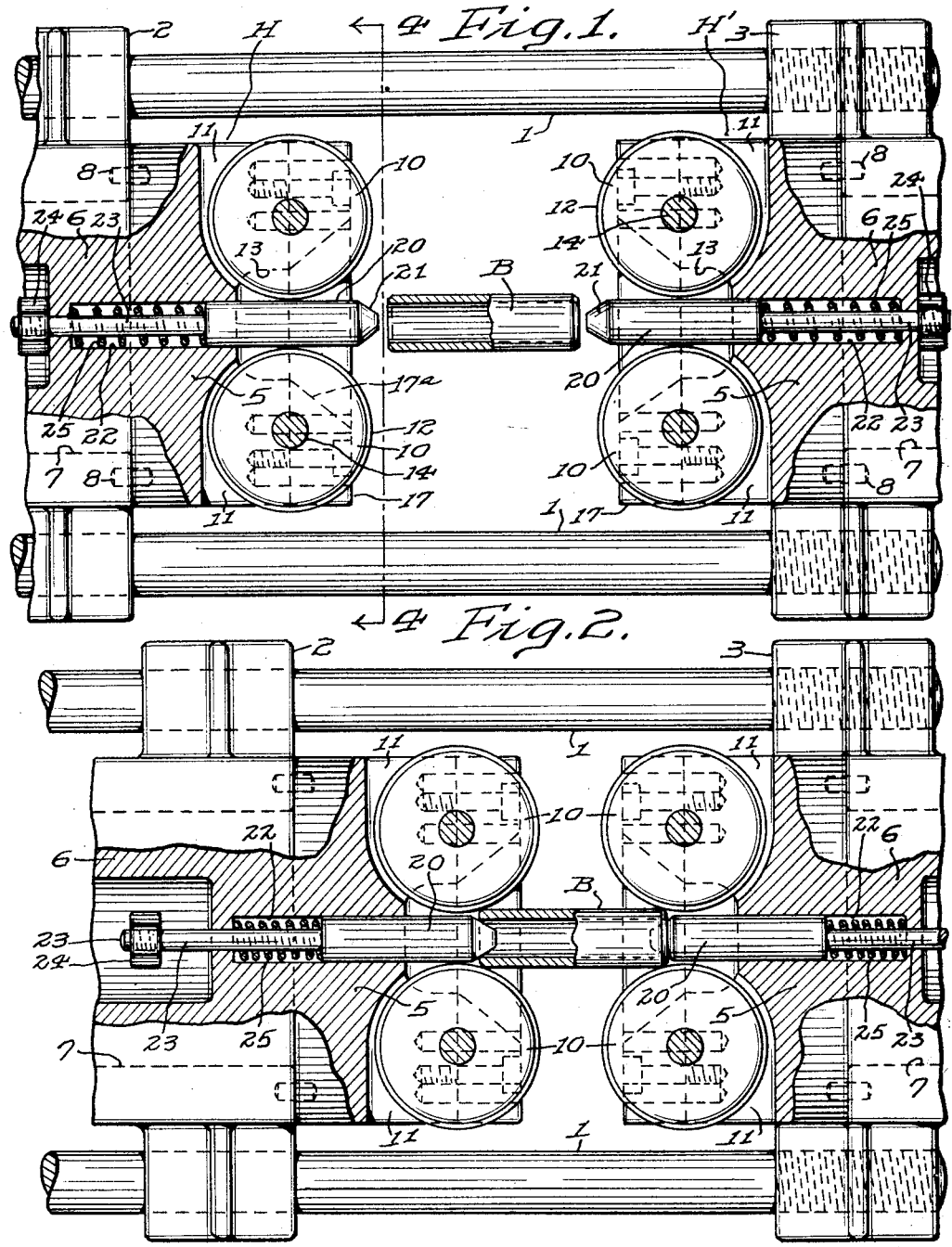
INVENTOR
William A. Tryon.
WITNESS
F. J. Hartman.
ATTORNEYS Nov. 29, 1932.  W. A. TRYON  1,889,324
METHOD OF FORMING GROOVES IN THE ENDS OF TUBULAR ARTICLES
Filed Jan. 27, 1931  4 Sheets-Sheet 2
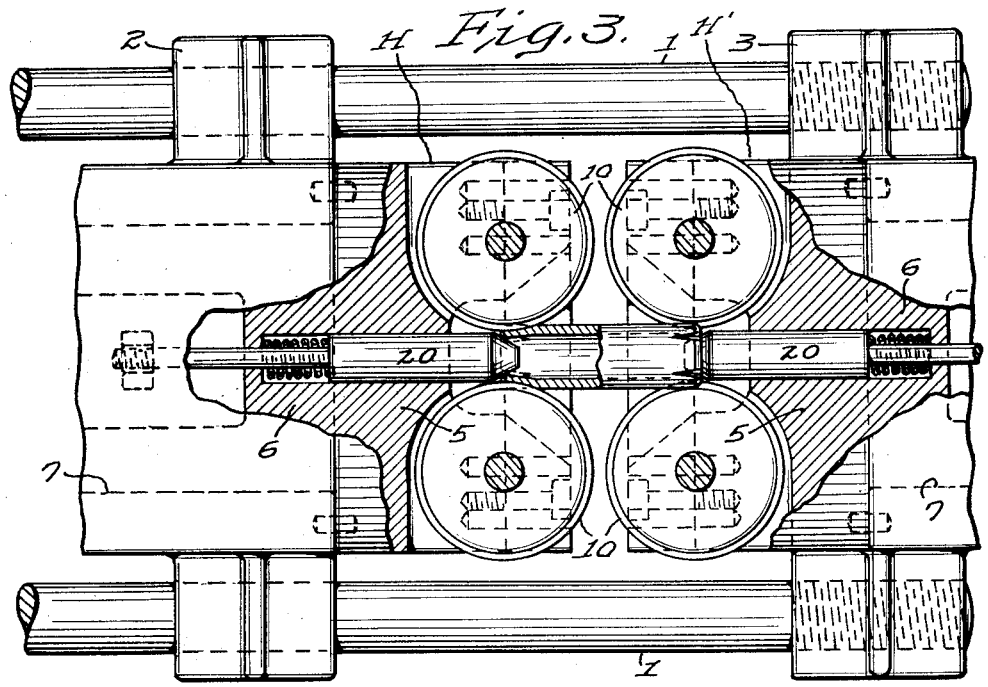
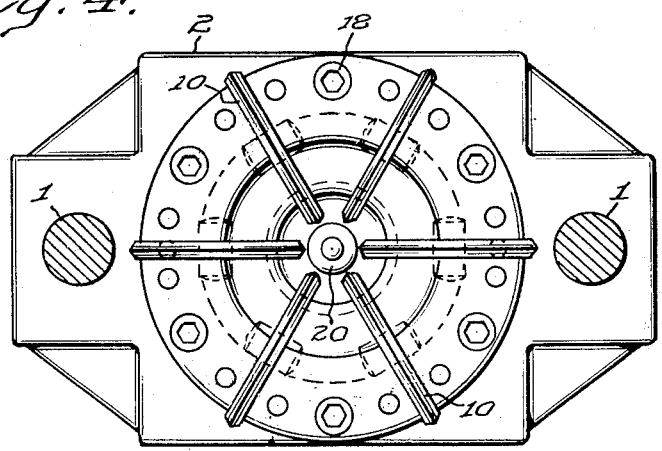
INVENTOR
William A. Tryon
BY
ATTORNEYS
WITNESS Nov. 29, 1932.  W. A. TRYON  1,889,324
METHOD OF FORMING GROOVES IN THE ENDS OF TUBULAR ARTICLES
Filed Jan. 27, 1931  4 Sheets-Sheet 3
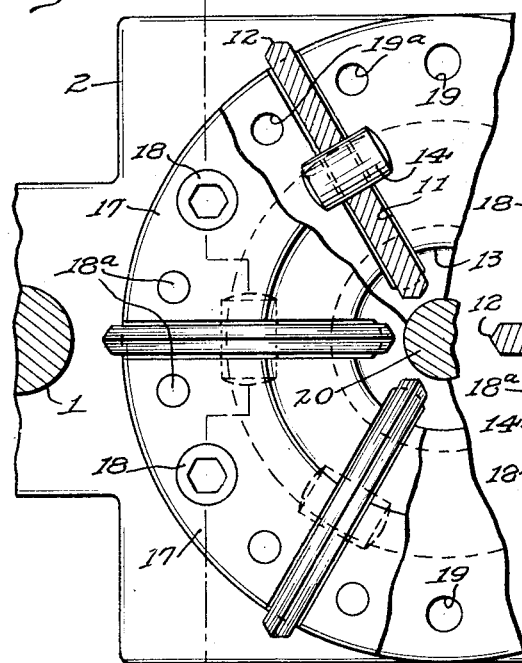
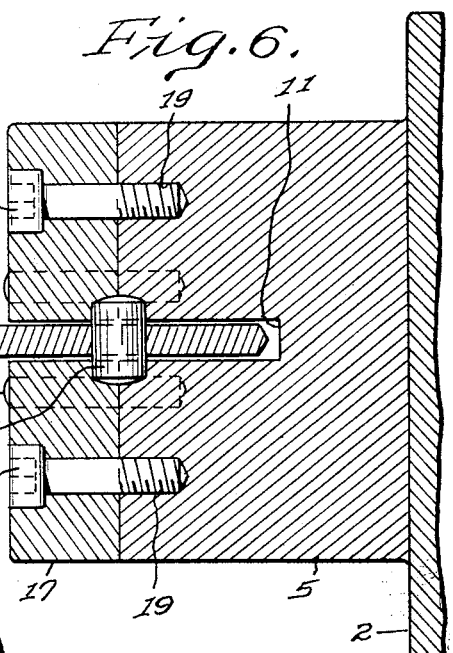
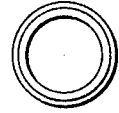
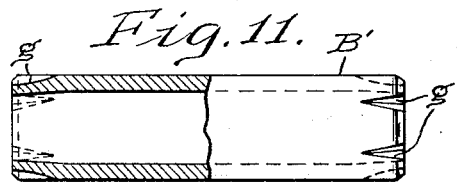
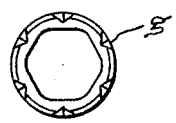
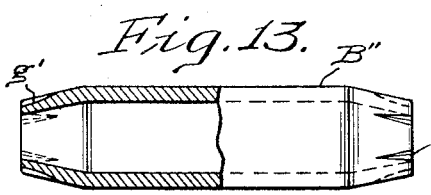
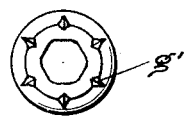
INVENTOR
William A. Tryon,
BY
ATTORNEYS
WITNESS Patented Nov. 29, 1932

1,889,324

UNITED STATES PATENT OFFICE

WILLIAM A. TRYON, OF ELMIRA, NEW YORK

METHOD OF FORMING GROOVES IN THE ENDS OF TUBULAR ARTICLES

Application filed January 27, 1931. Serial No. 511,497.

The present invention is particularly applicable to forming annularly spaced oil grooves in the ends of tubular pins such as are employed as component elements of certain well known forms of automotive spring shackles. These pins have oppositely tapered ends operatively seating in correspondingly tapered openings in the side links of the shackle whereby a bearing engagement is effected between the tapered surfaces of the pin and adjacent tapered surfaces of the openings and capacity for relative movement between the pins and side links afforded. In consequence, with a view to insuring proper and adequate lubrication of the bearing surfaces of the pins and side links, it is desirable to provide either one or both of said surfaces with circumferentially spaced oil grooves, preferably extending parallel with the axis of the pin about which the relative movement of the parts takes place, these grooves receiving oil from the interior of the pin or otherwise and serving to distribute it over said surfaces as they move relatively to each other. My invention is of especial utility in forming these oil grooves during the process of manufacture of the pins, as by means of it the said grooves may be produced very rapidly, at a minimum expense, and with the desired accuracy.

It will be understood, however, that the invention may be employed under many other conditions in which it is desired to produce circumferentially spaced, generally axially extending, grooves in the outer surface and adjacent the end of a tubular article as will be readily apparent to those skilled in the art from the following description of the invention, in the course of which reference will be had to the accompanying drawings. However, for convenience, and since, as stated, the invention is particularly adapted for the production of oil grooves in the ends of automotive shackle pins of the class described, I shall herein refer, for convenience and by way of illustration merely, to its employment for that purpose.

Figure 7:
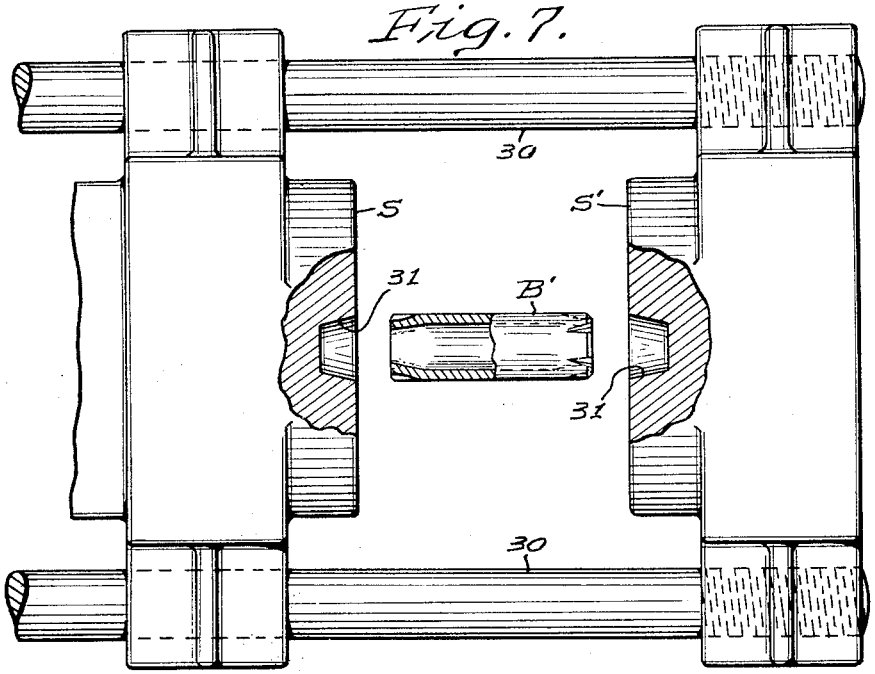
Figure 8:
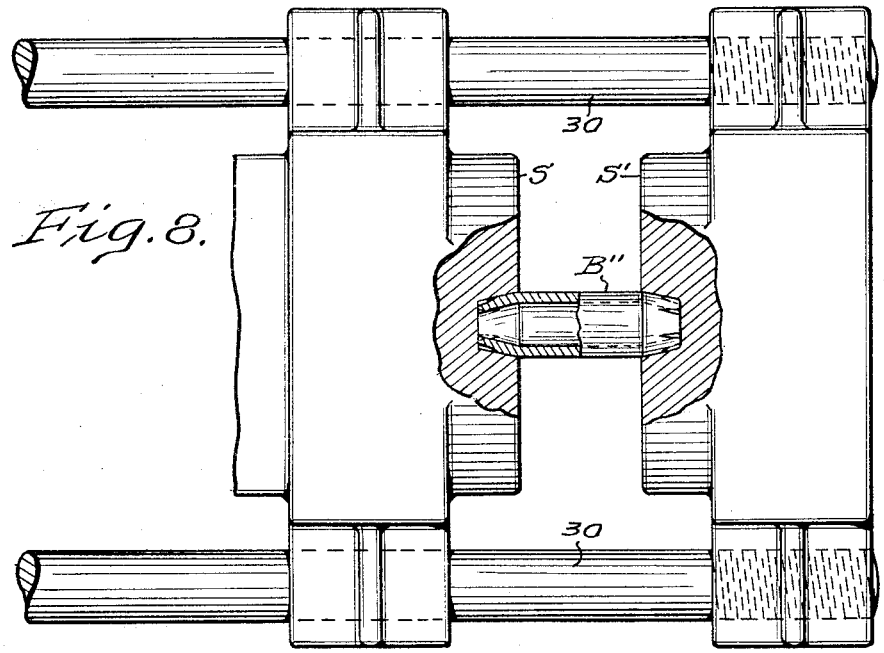

In the said drawings, Fig. 1 is a fragmentary top plan view, partially in elevation and partially broken away into section, of a portion of a machine constructed in accordance with the invention and suitable for the performance of the method comprehended thereby, and Figs. 2 and 3 are generally similar views respectively showing the parts in the positions which they progressively occupy during the formation of the grooves. Fig. 4 is a transverse section on line 4—4 in Fig. 1 showing in end elevation one of the heads of the machine. Fig. 5 is an enlarged fragmentary end elevation of one of the heads of the machine shown in Figs. 1, 2 and 3 with certain parts broken away into section to better illustrate the internal construction, and Fig. 6 is a section on line 6—6 of Fig. 5 with certain parts shown in elevation. In Figs. 7 and 8 I have fragmentarily shown certain parts of a second machine desirably employed to reduce the ends of the shackle pins to conical form after the grooves have been initially produced therein through the operation of the machine shown in the preceding figures; of these two figures, Fig. 7, which is a fragmentary top plan view partially broken away into section, shows the position of the parts when the grooved pin is being introduced, and Fig. 8 their position at the conclusion of the swedging or compressing operation. Figs. 9 to 14 inclusive are designed to show the progressive reduction of the tubular blanks from initial to final form, Fig. 9 being an elevation of the blank partially broken away into central section and Fig. 10 an end view thereof prior to its introduction to the grooving machine; Figs. 11 and 12, respectively corresponding to Figs. 9 and 10, show the blank after removal from the grooving machine, and Figs. 13 and 14, respectively corresponding to Figs. 11 and 12, show it after removal from the swedging machine. Throughout the drawings similar characters of reference are used to designate the same parts.

It will be understood that in the manufacture of shackle pins of the character to which I have referred, a length of suitable, generally steel, tubing is cut up in any convenient way to form blanks B of the desired length and that the ends thereof are then desirably slightly chamfered at their outer corners as at c. (See Figs. 9 and 10.) The blank is then in condition for the grooving operation and, after the grooves g are initially formed therein, desirably by means of the machine shown in Fig. 1 and related figures, the blank B' which then presents the appearance shown in Figs. 11 and 12, is transferred to a machine of the character of that shown in Figs. 7 and 8 which is operative to compress or swedge the ends to the desired conical form, the blank B'' at the conclusion of this swedging operation presenting substantially the appearance shown in Figs. 13 and 14. The conical surfaces are then customarily case or otherwise hardened and finally ground.

It will thus be understood that while the operations performed by the machine shown in Figs. 7 and 8 are desirable when the ends of the blank are to be oppositely tapered after the initial formation of the grooves therein, as in the course of the manufacture of shackle pins of the character described, the present invention is more particularly concerned with the initial formation of the grooves; in other words, the transformation of the blank from the condition shown in Figs. 9 and 10 to that shown in Figs. 11 and 12.

To facilitate an adequate understanding of the invention, reference will first be had to the machine shown in Fig. 1 and related figures, then to the manner of its use in accordance with the method of the present invention, and finally to the machine shown in Figs. 7 and 8 and the manner of its use in reducing the ends of the grooved blanks to conical form when desired.

Thus, referring first to Figs. 1 to 6 inclusive, the machine shown therein comprises a pair of heads H, H' desirably of generally similar construction so that a description of one will suffice for the other. These heads are oppositely disposed and arranged for relative movement toward and away from each other, conveniently by disposing them in a suitable actuating machine such as a press or the like in such way that one head H is adapted for reciprocation toward or away from the other head H' which is rigidly secured in the actuating machine, the particular type of the latter being a matter of choice. The machine, however, will usually comprise a pair of ways or guides 1, 1 on which a housing 2 carrying the head H can be reciprocated, and with a platen or housing 3 relatively immovable with respect to the guides and in which the other head H' is supported. In the drawings, the guides are shown as extending horizontally, but of course they may extend vertically or in any other direction depending upon the type of actuating machine utilized.

Each head consists of a cylindrical main portion 5 having an integral cylindrical neck 6 of smaller diameter adapted to seat in a corresponding bore 7 in the movable housing or in the platen as the case may be, pins 8 or other suitable means being desirably provided to prevent axial rotation of the heads in their supporting members, while some suitable means (not shown) is provided for maintaining the heads in operative position therein.

Each head is provided with a plurality of disks 10 respectively seating in radially extending slots 11 in the outer or front end of the head and freely rotatable on axes disposed at right angles to the planes of the disks. Each of these disks, as best shown in Fig. 6, is oppositely beveled or sharpened to form an edge 12, the angle of inclination between the converging peripheral faces of the disk being preferably somewhat greater than a right angle, but this angle may be varied materially in accordance with particular conformation of the grooves which it is desired to produce. The disks, which are made of hardened steel or other suitable material, are arranged in diametrically opposed pairs and circumferentially spaced about the head, the precise number of pairs of disks provided being determined by the number of grooves which it is desired to produce in the article.

As stated, each disk is freely rotatable on its own axis independently of the other disks, and the body of the head is provided with a central recess or bore 13 in its front face of sufficient diameter to permit the adjacent inner edges of the disks to project thereinto for a relatively considerable distance. Each disk is supported on a pin 14 and normally is arranged to rotate thereon, although under certain conditions it may be preferred to make the disk rigid or integral with the pin and permit the latter to turn in the head. In the former case, and as shown, the ends of the pin may be disposed in semi-cylindrical recesses cut in the face of the main portion of the head on opposite sides of the slot 11 in which the disk is disposed and in the under faces of segmental clamping plates 17 of proper size and width to fit between the slots and which are removably secured to the face of the head by bolts 18 passing through the plates and into threaded bores 19. These recesses are of such size that they will very snugly receive the ends of the pins so that when the plates are drawn against the face of the head by means of the bolts 18 the ends of the pins are firmly clamped in place and the pins thus prevented from axial rotation. Desirably the inner ends of the plates are outwardly inclined as at 17a so as to be relatively remote from the adjacent portions of the edges of the disks, while the slots 11 are only very slightly wider than the thickness of the disks so that movement of the latter axially of the pins is substantially prevented. Dowel pins 18a may be extended through the plates to register with holes 19a in the head to assist in maintaining the plates in proper position.

Means are also provided for centering and supporting the tubular blanks B as they are fed to the machine between the heads when the latter are in retracted position, said means preferably comprising a plunger 20 disposed axially of each head and having its forward end pointed as at 21 so as to be capable of entering and centering the adjacent end of the blank and extending rearwardly into a bore 22 in the head 5 and neck 6. The plunger is provided with a stem 23 of reduced diameter which passes through a bore of corresponding size provided behind the bore 22 and receives on its end a nut 24 which adjustably limits the possible forward movement of the plunger, a spring 25 coiled around the stem in the bore 22 operating to constantly yieldingly urge the plunger forwardly.

Reference will now be made to the manner of employing a machine of substantially the character just described in accordance with the method of the present invention. The heads having been secured in their supporting members and the machine otherwise adjusted for operation, the head H is first retracted from the head H' for a sufficient distance to permit one of the blanks B, to which reference has hitherto been made, to be introduced between the opposed ends of the plungers 20 as shown in Fig. 1. After the blank has been approximately aligned with the plungers as shown in Fig. 1, the head H is advanced so as to first enter the pointed ends of the plungers in the respectively adjacent ends of the blank, whereby as the head continues to move forward, the blank finally is entirely supported on the plungers and properly centered in the machine. As the plungers, because of their engagement with the inner walls of the blank, can now no longer move in relatively to the latter, they are maintained at a fixed distance apart by the blank itself during further advance of the head and are pushed oppositely outward in the bores 22 with corresponding compression of the springs 25 until the parts attain substantially the position shown in Fig. 2, in which it will be noted the edges 12 of the several disks are just engaging the chamfered corners c of the blank. Thereafter, as the head H continues to move toward the head H', the disks are effective to indent the blanks at their respective points of contact therewith and thus produce grooves g of a cross sectional form determined by the angularity between the peripheral faces of the disks and of a length determined by the distance through which the heads are caused to approach each other after the disks have been brought into contact with the ends of the blanks, the grooves of course being deepest at the ends of the latter and curving upwardly until they vanish into its surface. The position of the parts at the conclusion or toward the end of the working stroke is shown in Fig. 3. The head H is then backed off so as to first clear the disks from the blank which is then solely supported by the plungers until the latter, under the influence of springs 25, assume their initial position as shown in Fig. 1, thus allowing the blank to drop out of the machine and placing it in condition to receive the succeeding blank.

Normally, in the manufacture of shackle pins, the grooves are made about $3/8''$ long, the relative movement of approach between the heads being arrested when this result has been attained, but of course said movement can be continued so as to produce longer grooves or arrested earlier so as to produce shorter ones, its limit being usually determined by engagement of the disks of one head with those of the other.

It should be noted that in the grooving operation just described, the blank, supported solely on the plungers 20, is held in accurately centered relation with the machine and disks and, further, that the pressure exerted by the several disks is equalized both axially and radially of the blank with the result that if the blank is of substantially uniform wall thickness, the plurality of grooves simultaneously produced in it are of substantially the same size and contour. From an inspection of Fig. 12 it is apparent that there is a slight inward deformation of the wall of the blank in the vicinity of each groove but practically no deformation of its outer surface between the grooves so that the blank in the area in which the grooves are formed remains of substantially cylindrical contour save at the points where the grooves are actually located.

For certain purposes blanks which have been grooved in accordance with the method just described may be utilized without the performance of further operations thereon but when intended for shackle pins of the character to which I have referred the grooved blanks are desirably subjected to a further operation designed to oppositely inwardly taper their ends. For this purpose a machine of the character of that shown in Figs. 7 and 8 may be employed, this machine comprising heads S and S' arranged in opposed relation and relatively movable toward and away from each other, conveniently by making the head S slidable on the ways 30 and the head S' stationary with respect thereto as in the case of the heads H, H' already described. Each head is provided with a conical cavity 31 in its front face; these cavities, which are of course in axial alignment, approximate the outer diameter of the blank at their points of greatest diameter adjacent the faces of the heads and are symmetrically inwardly tapered in correspondence with the taper ultimately desired on the ends of the latter.

The initially grooved blanks B' are consecutively introduced into this machine in substantial alignment with the cavities 31 while the heads are retracted as in Fig. 7 and the ends of the blanks then compressed or swedged radially inward by moving the heads together to the extent permitted by the length of the blank as shown in Fig. 8. The heads are then separated so as to permit removal of the blanks from the machine and the succeeding blank to be introduced.

The appearance of the blank B'' after this swedging operation is shown in Figs. 13 and 14, from an inspection of which it will be noted that the ends of the blank are oppositely tapered toward its axis while the grooves g' have been progressively decreased in width toward the ends of the blank through the reduction in width thereof which has been effected. In the manufacture of shackle pins the blanks B' are now ordinarily hardened and ground to place them in condition for operative assembly in the shackles of which they are to form a component part.

It will, of course, be appreciated that the various operations to which I have referred as incident to my invention, such as the relative reciprocation of the heads and the introduction of the blank to and its removal from the positions in which it is acted upon may be, and ordinarily are, performed automatically, or substantially so, to enhance the speed of production and decrease labor cost, the particular means employed for these purposes forming no part of the invention and being largely a matter of choice. It will, however, be readily apparent that in accordance with the invention the grooving of the blanks and subsequent swedging operation incident to the tapering of the ends thereof may be carried out very rapidly and at a very low cost by the use of suitable machinery for performing the operations, among others, to which I have just referred. Moreover, while the invention is of particular utility for forming oil grooves in shackle pin blanks, it is by no means limited or restricted thereto but is capable of employment in numerous cases in which simultaneous formation of a plurality of circumferentially spaced grooves in the end of a tubular blank is desired.

While I have herein referred with considerable particularity to the practice of the method of my invention by means of a machine of the general character herein illustrated and described and which is also embraced thereby, I do not desire or intend to confine myself solely to the use of a machine of that character as other machines and instrumentalities may be employed if preferred, nor to restrict myself to any precise details of construction and arrangement of the various elements forming a part of the said machine as the same are capable of variation and modification in numerous particulars, without departing from the scope of the invention as defined in the appended claims.

Having thus described my invention, I claim and desire to protect by Letters Patent of the United States:

1. A method of forming a hollow tubular pin having an inwardly tapered extremity provided with circumferentially spaced substantially axially extending oil grooves, each of greatest width at its end adjacent the end of the pin, which comprises the steps of indenting a tubular blank adjacent one end by application of radial inwardly directed rolling pressure at circumferentially spaced diametrically opposed points thereby to form in its surface a plurality of V-shaped depressions with their apexes remote from the adjacent end of the blank and their points of greatest width adjacent thereto, and then inwardly tapering the indented extremity of the blank and narrowing said depressions simultaneously by application of radial and axial pressure to said extremity.

2. A method of forming a hollow tubular pin having oppositely inwardly tapered extremities provided with circumferentially spaced substantially axially extending oil grooves, each of greatest width at its end adjacent the corresponding end of the pin, which comprises the steps of simultaneously indenting a tubular blank adjacent its opposite ends by application of radial inwardly directed rolling pressure at circumferentially spaced diametrically opposed points thereby to form in its surface a plurality of V-shaped depressions with their apexes respectively remote from the adjacent end of the blank and their points of greatest width adjacent thereto, and then applying to the opposite extremities of the blank simultaneously radially inwardly directed and axial pressure thereby to oppositely inwardly taper said extremities and decrease the width of said grooves in one operation.

3. A method of forming a hollow tubular pin having oppositely inwardly tapered extremities respectively provided with circumferentially spaced, substantially axially extending V-shaped oil grooves, each of greatest width at its end adjacent the corresponding end of the pin, which comprises the steps of simultaneously indenting a cylindrical tubular blank at its opposite ends by application of rolling pressure at circumferentially spaced diametrically opposed points to thereby form in its surface a plurality of V-shaped depressions each having its sides converging relatively sharply from the adjacent end of the pin, and then applying to the opposite ends of the indented blank simultaneously radial inwardly directed and axial pressure to thereby oppositely inwardly taper the extremities of the blank and bring the sides of said depressions into more nearly parallel relation.

4. A method of inwardly tapering the extremities of a hollow cylindrical blank and forming oil grooves in the tapered surfaces thereof extending oppositely inward from the ends of the blank in circumferentially spaced relation thereabout, which comprises the steps of first subjecting the ends of the blank to radial inwardly directed rolling pressure at circumferentially spaced, diametrically opposed points to form thereby in the surface of the blank adjacent each end thereof a plurality of V-shaped depressions with their apexes remote from said ends and their points of greatest width adjacent thereto, and then subjecting the indented extremities of the blank to radially inwardly directed axial pressure to thereby inwardly taper said extremities and decrease the angle of convergence between the sides of said depressions in a single operation.

In witness whereof I have hereunto set my hand this 22nd day of January, 1931.

WILLIAM A. TRYON.